United States Patent
Goto et al.

(10) Patent No.: US 8,385,622 B2
(45) Date of Patent: Feb. 26, 2013

(54) IMAGE DIAGNOSTIC SUPPORT APPARATUS

(75) Inventors: Yoshihiro Goto, Tokyo (JP); Tetsuo Nakazawa, Tokyo (JP); Tetsushi Honda, Hokkaido (JP)

(73) Assignee: Hitachi Medical Corporation, Tokyo (JP)

( * ) Notice: Subject to any disclaimer, the term of this patent is extended or adjusted under 35 U.S.C. 154(b) by 541 days.

(21) Appl. No.: 12/670,604

(22) PCT Filed: Jul. 23, 2008

(86) PCT No.: PCT/JP2008/063180
§ 371 (c)(1),
(2), (4) Date: Jan. 25, 2010

(87) PCT Pub. No.: WO2009/017004
PCT Pub. Date: Feb. 5, 2009

(65) Prior Publication Data
US 2010/0189332 A1    Jul. 29, 2010

(30) Foreign Application Priority Data
Jul. 27, 2007  (JP) ................................ 2007-195653

(51) Int. Cl.
*G06K 9/00*    (2006.01)

(52) U.S. Cl. ...................................... 382/131; 600/425

(58) Field of Classification Search .......... 382/128–132; 600/425
See application file for complete search history.

(56) References Cited

U.S. PATENT DOCUMENTS

| | | | | |
|---|---|---|---|---|
| 6,577,752 | B2 * | 6/2003 | Armato et al. | 382/131 |
| 7,756,316 | B2 * | 7/2010 | Odry et al. | 382/131 |
| 8,208,992 | B2 * | 6/2012 | Goto et al. | 600/425 |
| 2002/0191827 | A1 * | 12/2002 | Armato et al. | 382/131 |
| 2003/0086599 | A1 * | 5/2003 | Armato et al. | 382/131 |
| 2006/0204063 | A1 * | 9/2006 | Nakashima et al. | 382/128 |
| 2007/0053485 | A1 | 3/2007 | Kobayashi | |
| 2007/0127802 | A1 * | 6/2007 | Odry et al. | 382/131 |
| 2010/0215225 | A1 * | 8/2010 | Kadomura et al. | 382/128 |

FOREIGN PATENT DOCUMENTS

| | | |
|---|---|---|
| JP | 2007-68844 | 3/2007 |
| WO | WO2006/118100 A1 | 11/2006 |
| WO | WO2007/145093 A1 | 12/2007 |

OTHER PUBLICATIONS

Chaisaowong et al., "Application of Supervised Range-Constrained Thresholding to Extract Lung Pleura for Automated Detection of Pleural Thickenings from Thoracic CT images", Proc. SPIE Medical Image, 2007.*
Honda, Hiroki, "A Trial the 3D Display of the Pleural Plaques Re-Constructed by the 3D CT Images Using", vol. 55, No. 1, pp. 49-54.

* cited by examiner

*Primary Examiner* — Gerald J. O'Connor
*Assistant Examiner* — Jonathan K Ng
(74) *Attorney, Agent, or Firm* — Cooper & Dunham LLP

(57) ABSTRACT

An image diagnostic support device is configured to acquire a tomographic image including a lung region of an object to be examined and is provided with image display to display the tomographic image. The device is also configured to set up a measurement range, extract the chest wall from the image in the set measurement range, extract a thickened portion incidental to the chest wall in the measurement range, and measure the thickness of a thickened portion at each position in the measurement range.

16 Claims, 10 Drawing Sheets

* 1 : DISTRIBUTION MEASUREMENT
* 2 : RIGHT LUNG FIELD
* 3 : LEFT LUNG FIELD

*1: DISTRIBUTION MEASUREMENT
*2: RIGHT LUNG FIELD
*3: LEFT LUNG FIELD

*1: DISTRIBUTION MEASUREMENT
*2: RIGHT LUNG FIELD
*3: LEFT LUNG FIELD

* 1 : DISTRIBUTION MEASUREMENT
* 2 : RIGHT LUNG FIELD
* 3 : LEFT LUNG FIELD

* 1 : DISTRIBUTION MEASUREMENT
* 2 : RIGHT LUNG FIELD
* 3 : LEFT LUNG FIELD

*1: DISTRIBUTION MEASUREMENT
*2: RIGHT LUNG FIELD
*3: LEFT LUNG FIELD

IMAGE DIAGNOSTIC SUPPORT APPARATUS

TECHNICAL FIELD

The present invention relates to an image diagnostic support device capable of identifying illness of lungs or indication thereof quantitatively based on the image data including lung fields of an object to be examined, particularly to the technique for quantifying the degree of illness attributed to accumulated asbestos in lungs.

BACKGROUND ART

In image diagnosis, it has been known that the accumulation of asbestos inhaled by an object in lungs can be found as thickness abnormality of a lung wall or chest wall. For example, Patent Document 1 discloses the technique for implementing image processing in a chest X-ray image to appropriately detect asbestos.

Patent Document 1: JP-A-2007-244738

Further, the illness attributed to asbestos can be diagnosed by a tomographic image obtained by an X-ray CT apparatus when the condition of illness becomes serious such as mesothelioma. Doctors have been diagnosing accumulation or illness of asbestos in patients' lungs by visual evaluation, by measuring the abnormality of thickness of lung wall or chest walls on images.

DISCLOSURE OF THE INVENTION

Problems to be Solved

However, visual evaluation or measurement of partial wall thickness can only partially reveal illness due to asbestos, and it is difficult to diagnose how much of the entire lung is exposed to asbestos causing the patient to suffer from lung asbestos or mesothelioma.

The objective of the present invention is to provide an image diagnostic support device capable of quantitatively presenting the illness or indication thereof of a lung based on the image data including lung fields of an object to be examined.

Means to Solve the Problem

The above-described objective can be achieved by an image diagnostic support device connected to image acquisition means configured to acquire a tomographic image including a lung region of an object, which comprises image display means configured to display the tomographic image acquired by the image acquisition means as an image, characterized in further comprising:

measurement range setting means configured to set the measurement range for extracting a chest wall from the image;

chest wall extracting means configured to extract a chest wall from the image within the set measurement range;

thickened portion extracting means configured to extract the thickened portion incidental to the chest wall within the measurement range; and thickened portion measuring means configured to measure the thickness of the thickened portion at each position in the measurement image.

Effect of the Invention

In accordance with the present invention, it is possible to provide an image diagnostic support device capable of quantitatively presenting illness or the indication thereof based on the image data including the lung field of an object to be examined.

DESCRIPTION ON REFERENCE NUMERALS

50: fatty region, 51: proportion of the region thicker than the designated thickness of a lung wall

BEST MODE FOR CARRYING OUT THE INVENTION

The best mode for carrying out the invention will be described below referring to the attached diagrams. In all diagrams for explaining embodiments of the invention, explanation of the places having the same function will be omitted by appending the same numeral reference.

Embodiment 1

Figure 1:
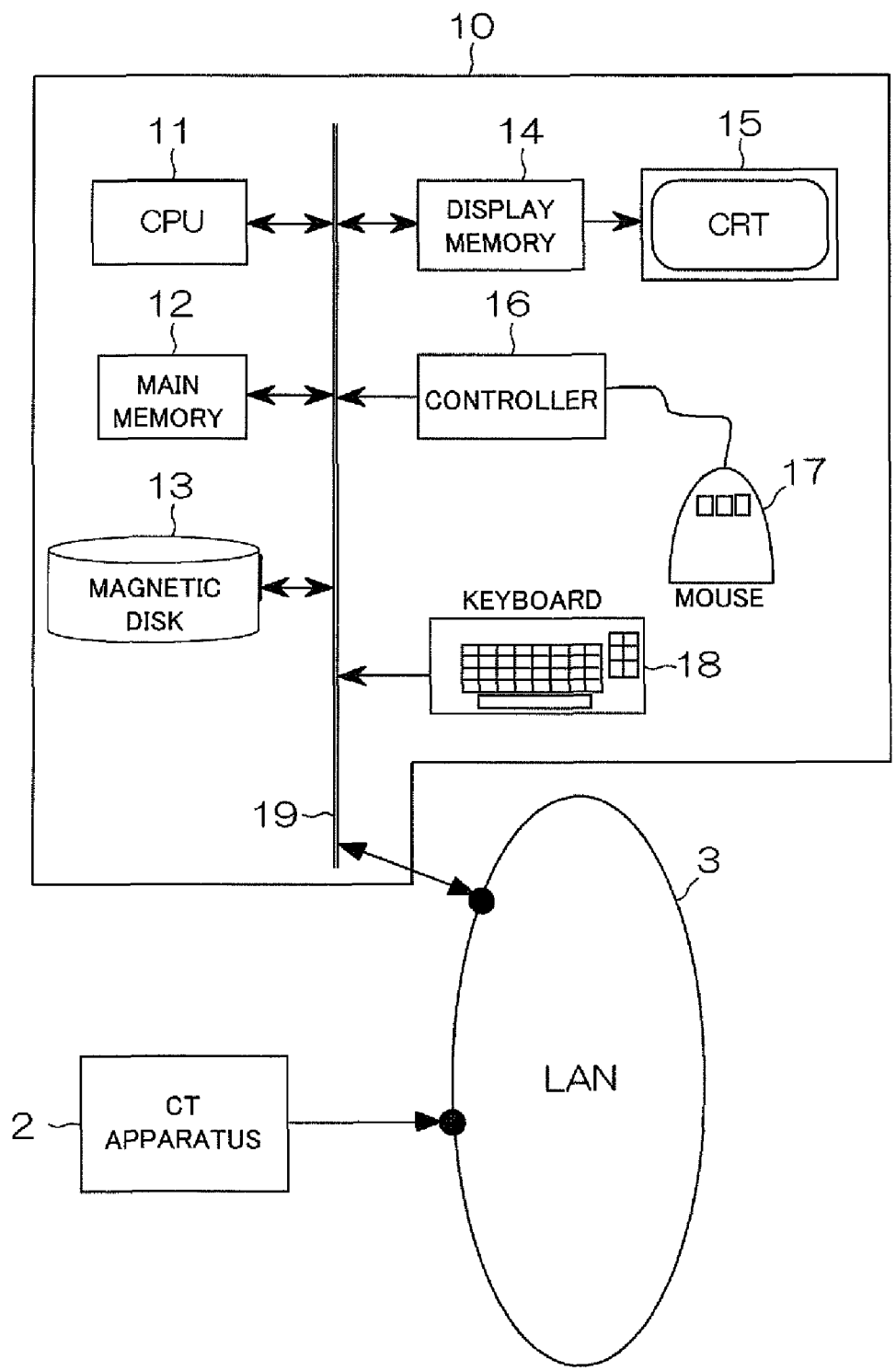
FIG. 1 is a schematic view showing the general configuration of the image diagnostic support device related to the present invention.

FIG. 1 is a hardware configuration diagram showing an example of configuration of an entire image diagnostic support device related to embodiment 1 of the present invention.

In concrete terms, image diagnostic support device 10 is connected to medical imaging apparatus 2 configured to perform imaging of an object as image acquisition means for acquiring a tomographic image including, for example, a lung region of the object via a network such as LAN 3. While an X-ray CT apparatus is exemplified as medical imaging apparatus 2, any apparatus capable of constructing images (preferably 3-dimensional images) such as an MRI apparatus or ultrasonic diagnostic apparatus may be used instead.

Image diagnostic support device 10 is mainly configured by central processing unit (CPU) 11 to be a control device for controlling the operation of the respective components, main memory 12 in which the control program of the device is stored or to be the operation region upon executing programs, magnetic disk 13 for storing various application software including operating system (OS), devise drive of peripheral equipment or a program for executing process such as measuring thickness of a chest wall, display memory 14 for temporarily storing display data, monitor 15 such as a CRT monitor or LCD monitor for displaying images based on the data from display memory 14 as image display means for displaying tomographic images acquired by image acquisition means as an image, mouse 17 as a position input device, controller 16 for detecting the condition of mouse 17 and outputting the position of a mouse pointer on monitor 15 or signals of the condition of mouse 17, etc., keyboard 18, and bus 19 for connecting the above-mentioned respective components.

CPU 11 reads out the above-mentioned program from magnetic disk 13, and loads them into main memory 12 to carry them out.

In FIG. 1, while magnetic disk 13 is connected as a storage device other than main memory 12, an optical disk drive, etc. may be connected besides them.

Figure 2:
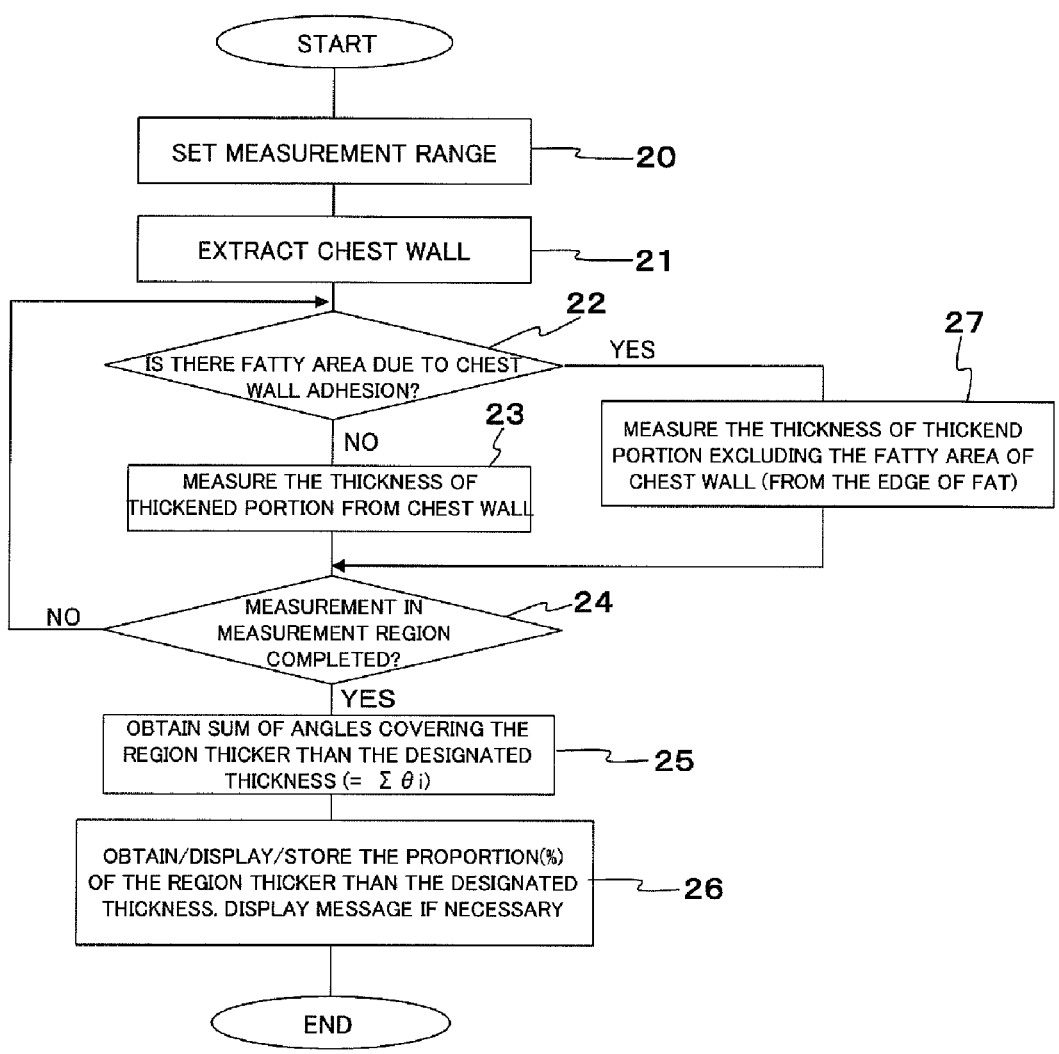
FIG. 2 is a flowchart showing the flow of processing in first embodiment of the above-mentioned image diagnostic support device.

Next, the flow of processing in embodiment 1 will be described using FIG. 2.

(Step 20)

Figure 3:
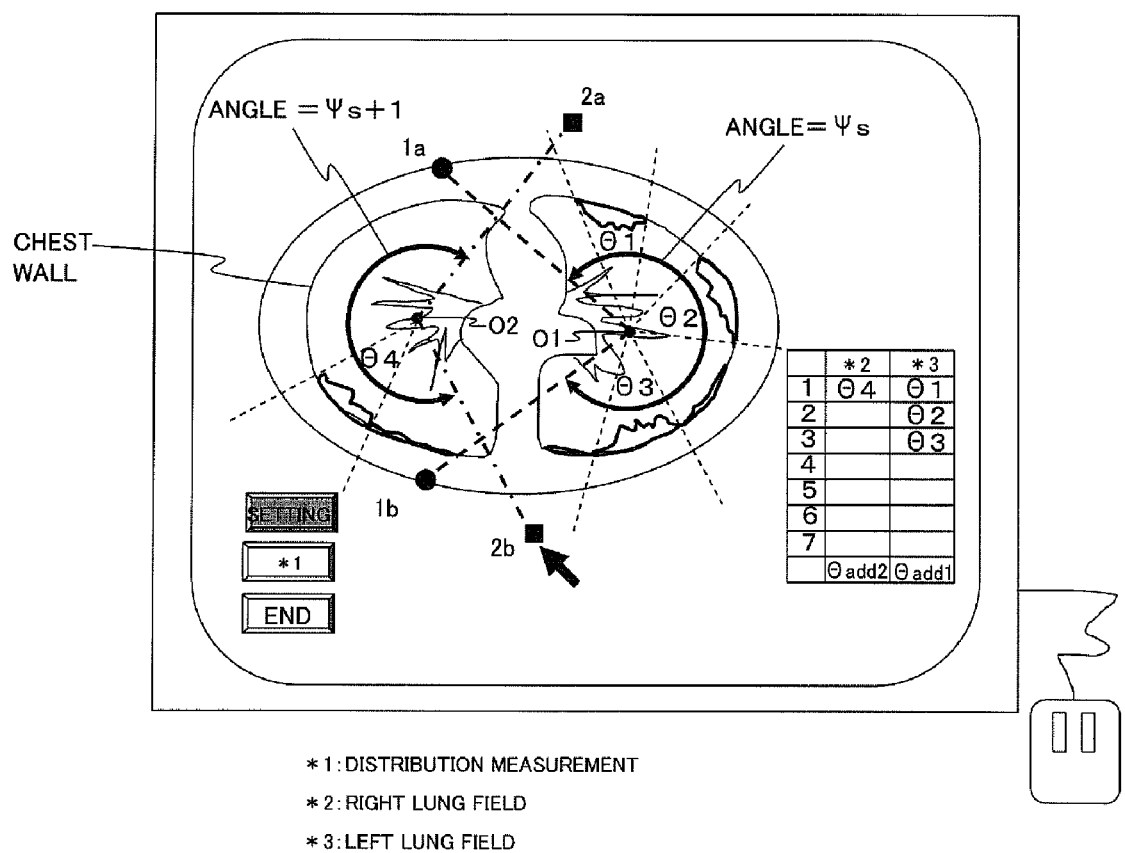
FIG. 3 is an explanatory diagram showing an example of the operation for setting a measurement range in FIG. 2.

An operator such as a doctor displays an axial image such as a CT image or an MRI image on monitor 15, designates points such as reference numerals 1a, 1b, 2a and 2b shown in FIG. 3 by operating mouse 17, and sets a measurement range for extracting a lung wall from the image (the range indicated by angles $\psi s$, $\psi s+1$) by measurement range setting means. In concrete terms, central position $O_1$ on the left lung and central position $O_2$ on the right lung are respectively obtained by calculation in advance for each of the left and the right lung or inputted by input means. By inputting the two points denoted by reference numerals 1a and 1b, the lung wall range on the right side of the diagram to be the evaluation target is determined as angle $\psi s$, and by inputting the two points denoted by reference numerals 2a and 2b, the lung wall range on the left side on the diagram to be the evaluation target is determined as angle $\psi s+1$. In this manner, the designated measurement range is to be displayed by image display means, using the angles centering on the respective central positions of the right and the left lungs. This measurement range may be automatically designated by computer as will be described later.

(Step 21)

Figure 4:
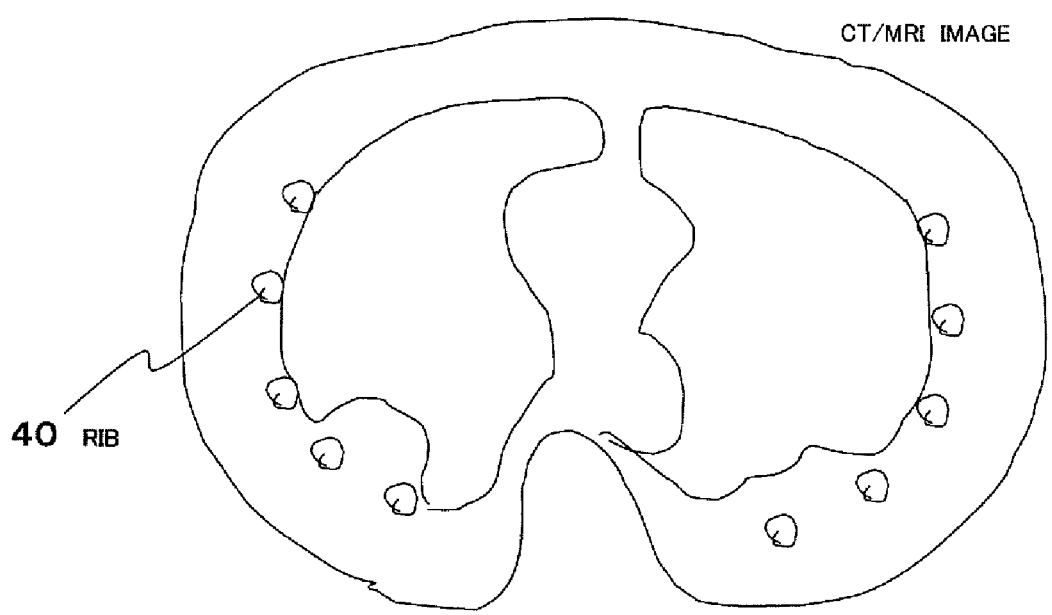
FIG. 4 is an explanatory diagram showing an example of the calculation of a chest wall in FIG. 2.

CPU 11 extracts a chest wall from the image within the designated measurement range, using chest wall extracting means. As shown in FIG. 4, the chest wall is to be extracted by setting the position at just inside of a rib 40 as the chest wall. As for the extracting method, for example, CPU 11 can extract the next rib having a high CT value, and connecting the inside thereof using spline interpolation. Or, CPU 11 can determine the threshold value so as to extract the inner side of ribs as a chest wall, and perform threshold value processing to accomplish the extraction.

(Step 22)

CPU 11 determines whether or not a fatty region which is attached firmly to the chest region within the measurement range (numeral 50 in FIG. 5) exists. The fatty region is generally disposed on the inner side of a chest wall between the plaque which is the target for diagnosing the diseased area and muscle, and displayed on an image with a low CT value. Therefore, the tissues are arranged from the lung wall side in order of the region having a high CT value, the region having a low CT value and the region having a high CT value, and if there is a portion that has CT value lower than the surrounding area, it is determined as a fatty region (fatty portion). If there is a fatty region CPU 11 carries out step 27, and if there is no fatty region step 23 is to be carried out.

(Step 23)

CPU 11 extracts a thickened portion in the respective measurement range positions toward the inner side of the chest wall by thickened portion extracting means, and measures the thickness of the thickened portion by thickened portion measuring means in the respective measurement range positions.

In this case, the thickness is to be measured in the vertical direction with respect to the chest wall.

(Step 24)

CPU 11 determines whether the measurement within the measurement region set in step 20 is completed or not. If the measurement is completed CPU 11 carries out step 22, and if not completed step 25 is to be carried out.

(Step 25)

CPU 11 discriminates the region which is thicker than the previously designated thickness of the thickened portion (for example, 5 mm. Variable by GUI) and the other region, and obtains the sum of the angles ($=\Sigma\theta i$) viewed from the central lung field of the thick regions ($0_1$ and $0_2$ in FIG. 3).

(Step 26)

Figure 5:
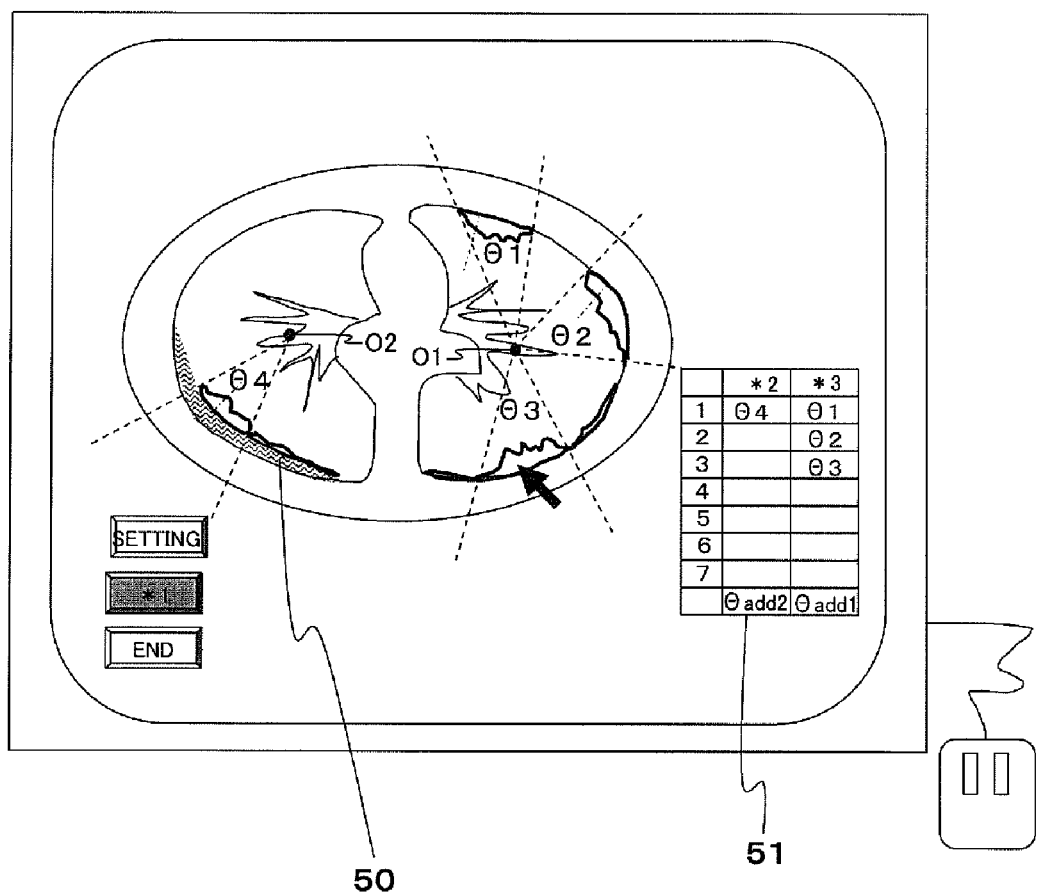
FIG. 5 is an explanatory diagram showing a display example of the distribution measurement in FIG. 2.

CPU 11 obtains the proportion (percentage) of the region in the lung wall which is thicker than the designated thickness, and displays the obtained proportion as shown by reference numeral 51 in FIG. 5. In other words, CPU 11 creates, using distribution information creating means, the distribution information of the thickened portion which is extracted by thickened portion extracting means, and presents the distribution information created by distribution information creating means.

If the obtained proportion is greater than the previously designated proportion (for example, 50%. Variable by GUI), CPU 11 displays the message "this region has accumulation of asbestos which is more than 50% of the lung's boundary length". Accordingly, distribution information creating means respectively obtains the angle viewed from the center of a lung field in the measurement range and the angle viewed from the center of the lung field in a thickened portion having the thickness of the reference value and above or the thickness greater than the reference value, obtains the proportion of the angle viewed from the center of lung field in the thickened portion having the thickness of the reference value and above or the thickness greater than the reference value with respect to the angle viewed from the center of lung field in the measurement range, and generates a message in the case that the obtained proportion is greater than the predetermined proportion. The messages can be delivered by visual display, voice or vibration, i.e. any means to communicate the message to one or more of the five senses of an operator. In the present specification, communication of information by CPU 11 to an operator through means such as display or voice will be generally referred to as "presentation".

Also, detection targets can be either one piece (one slice) of CT image, a plurality of consecutive CT images (N-slices) in the body axis of an object to be examined, or a plurality of inconsecutive CT images (N-slices). The proportion of the thickened portion with respect to the entire lung-wall region in 1 slice or in N-slices can be obtained respectively by the equations below.

$$\text{Proportion in 1 slice} = \frac{\sum \theta i}{\Psi s + \Psi s + 1} \times 100$$

$$\text{Proportion in } N \text{ slices} = \frac{\sum_{s}^{N}\sum_{i} \theta i}{\sum_{s}^{N}(\Psi s + \Psi s + 1)} \times 100$$

(Step 27)

CPU 11 measures the thickness of a thickened portion excluding a fatty area so as not to include the fatty area (fatty portion). In concrete terms, in the position having a fatty area, the thickened portion is to be measured from the most inner side of the fatty area. Here again, the thickness is to be measured in the vertical direction to the chest wall. CPU 11 obtains the thickness of the thickened portion by subtracting the length of the fatty area from the length between the chest wall and the most inner side of the thickened portion. Or, CPU 11 can also obtain the length from the most inner side edge of the fatty area to the most inner side edge of the thickened portion as the thickness of the thickened portion.

Also, CPU 11 may add θi, ψs and ψs+1 with respect to each position in order to obtain the proportion as a solid angle.

In accordance with the present embodiment, it is possible to quantitatively present the distribution condition of a diseased area including asbestos (degree of illness) to doctors. The present embodiment also has an advantage that the distribution condition of a diseased area can be quantitatively presented using either pathognomonic one slice of CT image or a plurality of consecutive slices of CT image.

Embodiment 2

Figure 6:
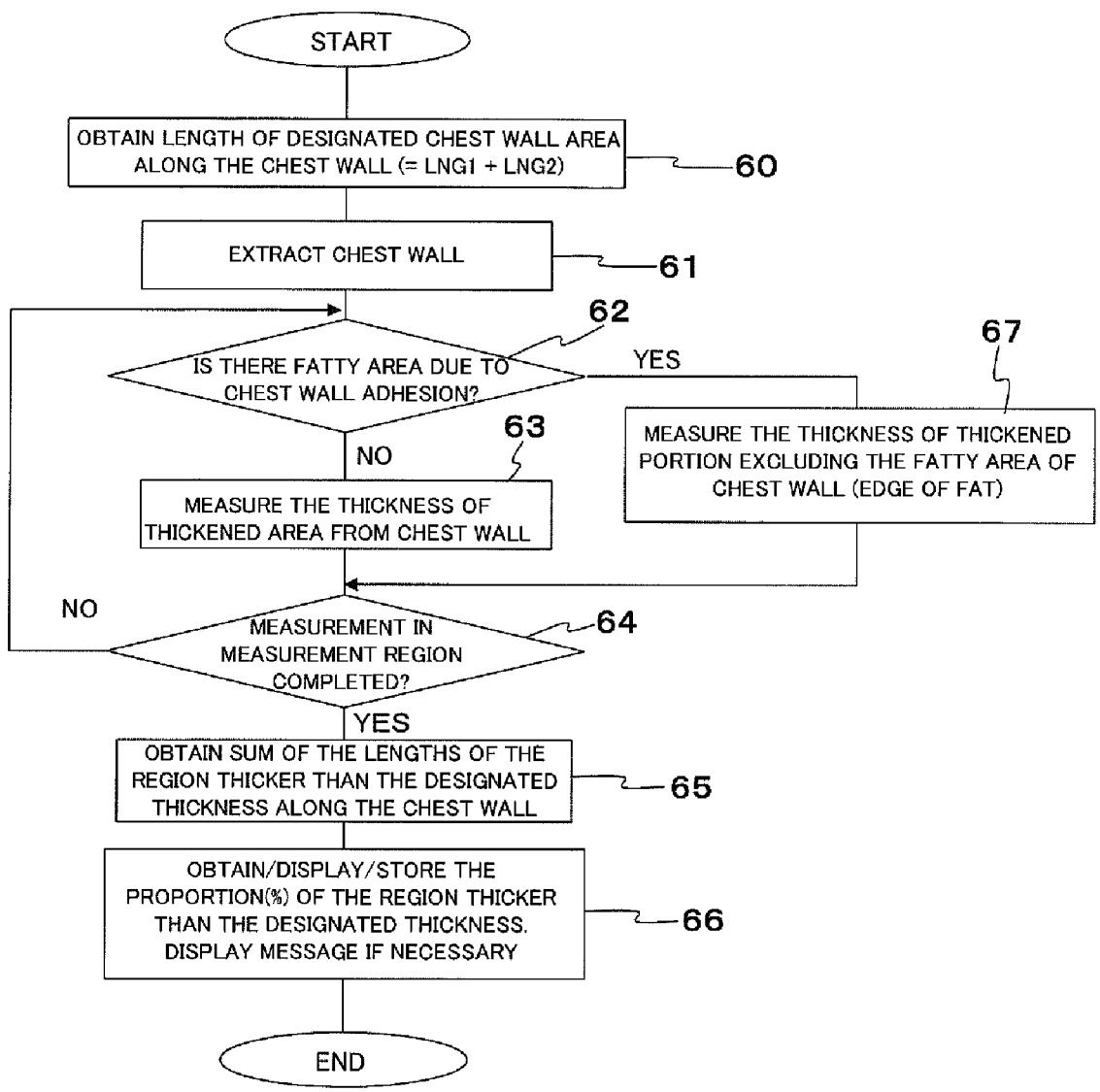
FIG. 6 is a flowchart showing the flow of processing in second embodiment of the above-mentioned image diagnostic support device.

Next, another method for quantifying a thickened portion will be described. The flow of processing in embodiment 2 will be described below using FIG. 6.

(Step 60)

Figure 7:
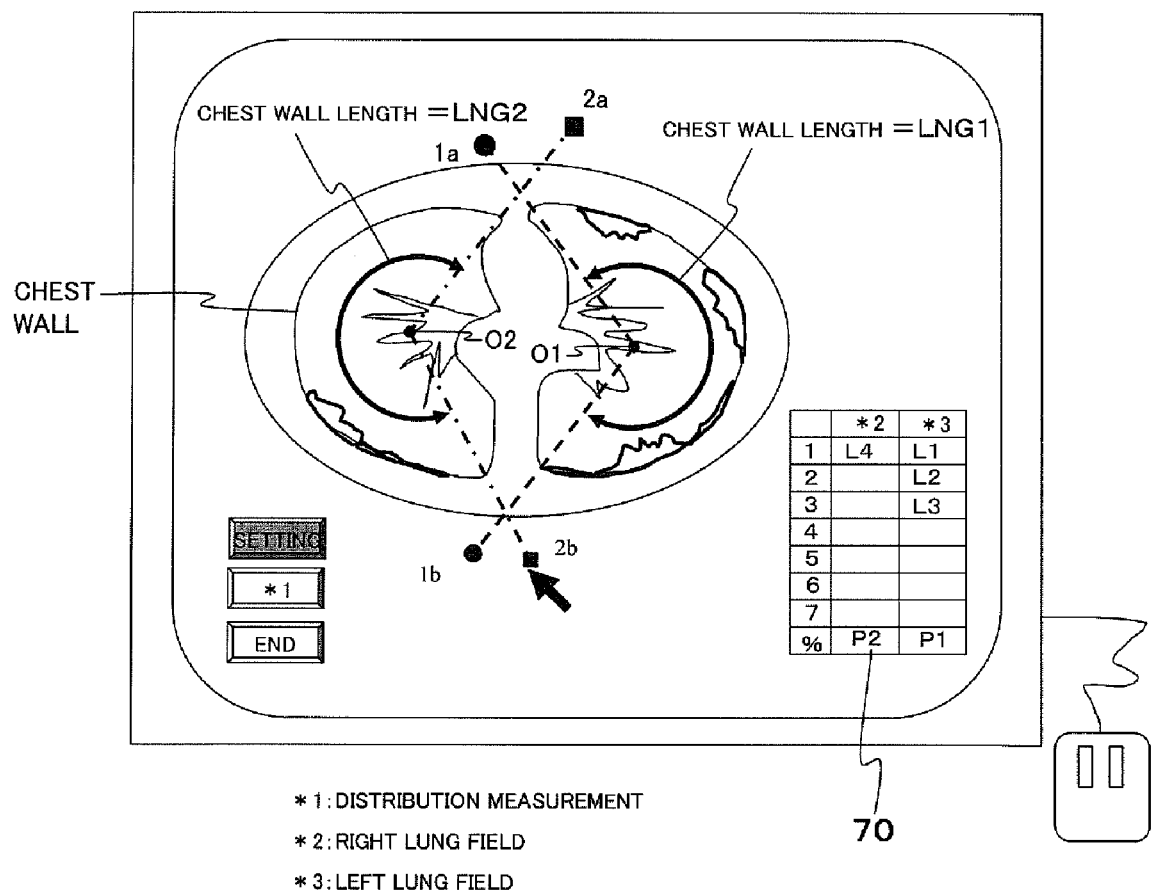
FIG. 7 is an explanatory diagram showing an example for setting a measurement range in FIG. 6.

An operator such as a doctor displays an axial image such as a CT image or MRI image on monitor 15, designates points as shown in reference numerals 1a, 1b, 2a and 2b in FIG. 7, and sets a measurement range for extracting a lung wall on the image (the range indicated by the lung wall lengths LNG1 and LNG2 of a left lung and a right lung. In concrete terms, left-lung central position $O_1$ and right-lung central position $O_2$ are previously appointed. The length of the target wall range in the lung on the right side of the diagram is determined as LNG1 by inputting reference numerals 1a and 1b, and the length of the target wall range in the lung on the left side of the diagram is determined as LNG2 by inputting reference numerals 2a and 2b. The designated measurement range is to be displayed according to the length along the chest walls on the right and the left lungs by image display means. The measurement range may be designated automatically by a computer as to be described later.

(Step 61)

CPU 11 extracts the lung wall along the designated measurement range. As in embodiment 1, as shown in FIG. 4, the chest wall is to be extracted by making the immediate inner side of rib 40 as a chest wall. As for the method thereof, for example, CPU 11 may extract the rib having high CT value, and make the immediate inner side thereof as a chest wall by performing spline interpolation. Or, CPU 11 may extract the chest wall using threshold value processing by setting the threshold value so as to extract the inner side of a rib as a chest wall.

(Step 62)

CPU 11 determines whether or not the fatty area adhering to a lung wall (reference numeral 80 in FIG. 8) exists. The fatty area is located on the inner side of a chest wall between the target plaque for pathology diagnosis and a muscle, and is displayed on an image with low CT value. Therefore, if the tissues are located from the lung wall in order of the high CT value region, low CT value region and high CT value region, the low CT value region in the middle is determined as a fatty area. CPU 11 carries out step 67 if a fatty area exists, and carries out step 63 if there is not a fatty area.

(Step 63)

CPU 11 measures the thickness of a thickened portion from a chest wall. It is to be measured in the vertical direction with respect to the chest wall.

(Step 64)

CPU 11 determines whether or not the measurement within the measurement range designated in step 60 is completed. CPU 11 carries out step 62 if the measurement is not completed, and carries out step 65 if completed.

(Step 65)

CPU 11 discriminates the region which is thicker than the previously designated lung wall thickness (for example, 5 mm. Variable by GUI) and the other portion, and obtains the sum of the lengths in the thick region (=ΣLi).

(Step 66)

Figure 8:
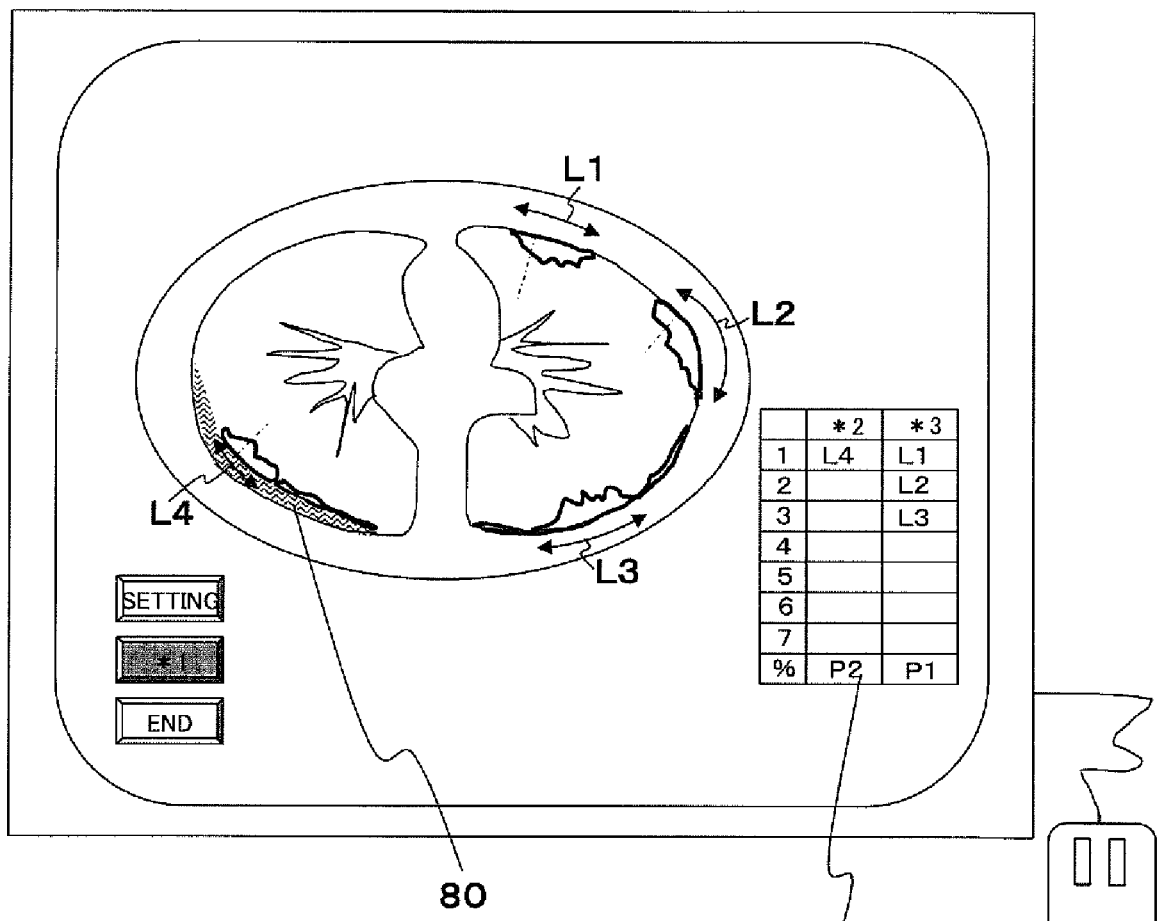
FIG. 8 is an explanatory diagram showing a display example of the distribution measurement in FIG. 6.

CPU 11 obtains the proportion (percent) of the region thicker than the designated lung wall thickness, and displays the ratio as shown in 81 of FIG. 8. More concretely, distribution information of the thickened portion extracted by thickened portion extracting means is created by distribution information creating means, and the created distribution information is presented by distribution information presenting means. In this case, the distribution information of the left lung field is P1=100×(L1+L2+L3)/LNG1, and the distribution information of the right lung field is P2=100×L4/LNG2. CPU 11 displays the message meaning that "the region has the accumulation of asbestos which is more than 50% of the lung's circumferential length" if the proportion is greater than the previously designated one (for example, 50%. Variable by GUI).

In other words, distribution information creating means obtains each of the length of the measurement range and the length along the chest wall of the thickened portion having the thickness of the reference value and above or the thickness greater than the reference value, obtains the proportion of the length of thickened portion having the thickness of the reference value and above or the thickness greater than the reference value with respect to the length of the measurement range, and creates a message if the obtained proportion is greater than a predetermined proportion. The messages can be delivered by visual display, voice or vibration, i.e. any means to communicate the message to one or more of the five senses of an operator. In the present specification, communication of information by CPU 11 to an operator through means such as display or voice will be generally referred to as "presentation".

Also, detection targets can be either one piece (one slice) of CT image, a plurality of consecutive CT images (N-slices) in the body axis of an object to be examined, or a plurality of inconsecutive CT images (N-slices). The proportion of 1 slice, and the proportion of the thick portion in the lung wall of N-slices with respect to the entire lung wall region can be obtained respectively by the equations below.

$$\text{Proportion in 1 slice} = \frac{\sum Li}{LNG1 + LNG2} \times 100$$

$$\text{Proportion in } N \text{ slices} = \frac{\sum_{s}^{N}\sum_{i} Li}{\sum_{s}^{N}(LNGs + LNGs + 1)} \times 100$$

(Step 67)

CPU 11 measures the thickness of the thickened portion excluding a fatty area. Concretely, in the region including a fatty area, the thickness of the thickened portion is to be measured from the position which is the most inner side of the fatty area. Here, the thickness is also to be measured in the vertical direction with respect to the chest wall. CPU 11 obtains the thickness of the thickened portion by subtracting the length of the fatty area from the length between the chest wall and the most inner side end of the thickened portion. Or, CPU 11 can also obtain the thickness of the thickened portion by measuring the most inner end of the fatty area to the most inner side end of the thickened portion.

Also, CPU 11 may obtain the proportion as an area by multiplying the slice thickness by Li and LNGs.

In accordance with the present embodiment, it is possible to quantitatively present the distribution state of affection (degree of illness) including asbestos to doctors. This embodiment also has an advantage that the distribution state of an illness can be quantitatively presented either in characteristic one slice of CT image or in a plurality of consecutive slices of CT images.

Embodiment 3

Figure 9:
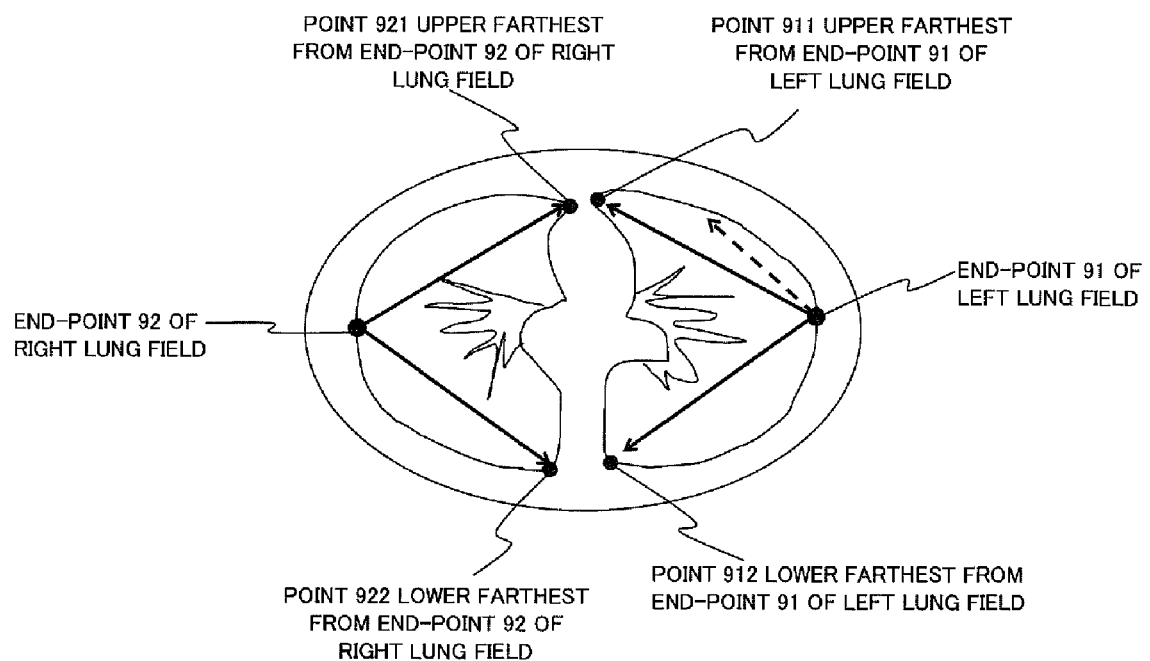
FIG. 9 is an explanatory diagram showing the principle of the third embodiment in the above-mentioned image diagnostic support device.

Next, the process in embodiment 3 will be described referring to FIG. 9.

Another example of the automatic determination method for determining the measurement range mentioned in step 20 of embodiment 1 and in step 60 of embodiment 2 will be described below.

First, CPU 11 obtains end point 91 of a left lung. The position of end point 91 does not have to be limited to this particular position, and can be anywhere in the vicinity thereof. Measurement range setting means obtains point 911 which is the upper farthest point on the chest wall from end point 91 of the left lung field and point 912 which is the lower farthest point on the chest wall from end point 91 of the left lung field, and sets the chest wall along the lung's circumference which is connected by point 911 and point 912 as the measurement range.

In the same manner, CPU 11 obtains end point 92 of a right lung. The position of end point 92 does not have to be limited to this particular position, and can be anywhere in the vicinity thereof. Measurement range setting means obtains point 921 which is the upper farthest point on the chest wall from end point 92 of the right lung field and point 922 which is the lower farthest point on the chest wall from end point 92 of the right lung field, and sets the chest wall along the lung's circumference which is connected by point 921 and point 922 as the measurement range.

For example, when the length from the central point of the right lung field to the chest wall is set as Ri, the length of the lung wall determined in step 26 of embodiment 1 will be obtained as L=ΣRi×dθ (dθ=minute angle), the length of the lung wall where thicker than 5 mm will be obtained as L'=ΣRi'×dθ, the proportion (%) will be obtained as 100×L'/L. These lengths and proportion of a left lung can be obtained in the same manner as the case of a right lung.

The present embodiment is characterized in that measurement range setting means sets a measurement range of a chest wall by obtaining two end points on the right and the left lungs and two points each that are upper farthest and lower farthest with respect to the two end points.

In accordance with the present embodiment, it is possible to present the distribution state of the illness including asbestos. The present embodiment has a characteristic advantage that the labor of trial and error process related to the setting of measurement ranges can be saved, since the measurement range can be set automatically.

Embodiment 4

Next, process of embodiment 4 will be described.

In the present embodiment, when the thickness of the chest wall is the reference value and above or greater than the reference value, the message will not be displayed as described in step 26 in embodiment 1 and step 66 in embodiment 2, but the region will be colored, for example in red, and displayed on CRT 15.

This embodiment is characterized in that distribution information presenting means appends colors on the positions wherein thickened portions are thicker than a reference value. In accordance with the present embodiment, it is possible to present the distribution state of illnesses including asbestos. The characteristic advantage of the present embodiment is that operators can intuitively identify anatomic locations of the accumulation of asbestos, etc. since affected areas on CT images are displayed with colors.

Embodiment 5

Figure 10:
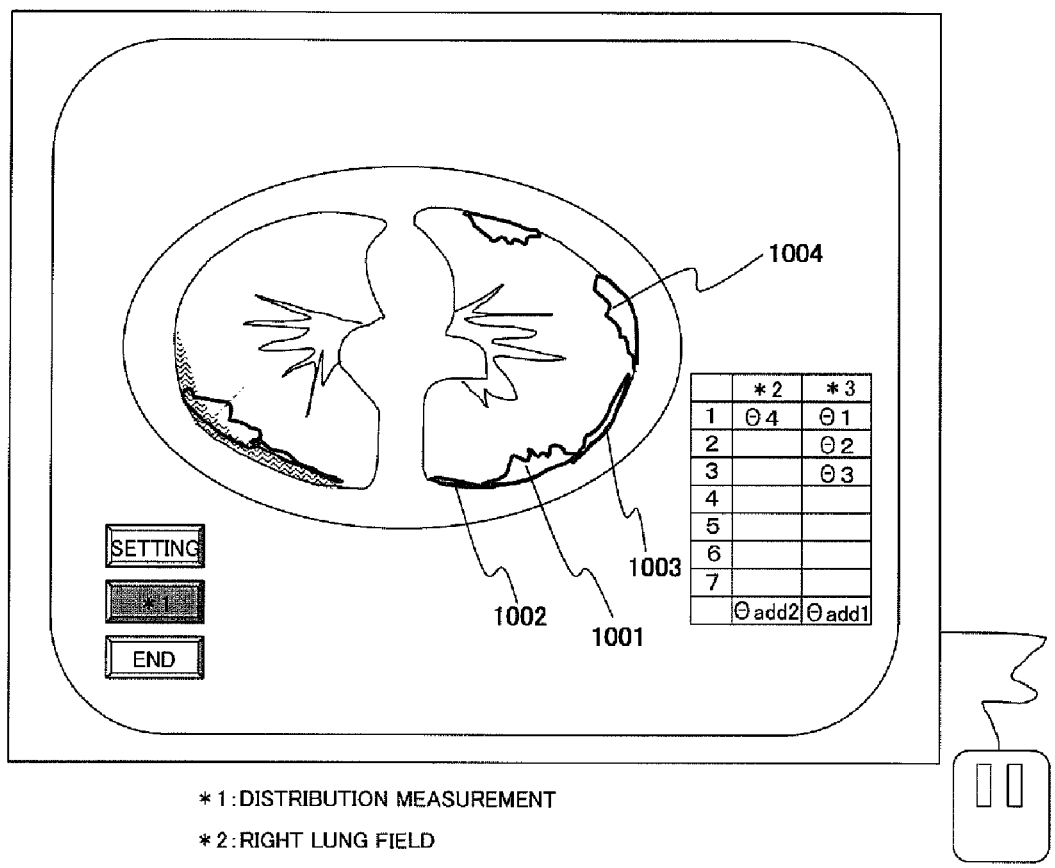
FIG. 10 is an explanatory diagram showing the principle of the fifth embodiment in the above-mentioned image diagnostic support device.

Next, embodiment 5 will be described referring to FIG. 10.

In embodiment 5, the position of the thickest part in a thickened portion will be displayed on a screen. In accordance with the present embodiment, when the thickness of the thickened portion is measured in steps 23 and 27 of embodiment 1, the thickness and position 1001 of the portion having the maximum thickness is to be displayed as "maximum thickness 550 mm, location (x:750 mm, y:300 mm)". Also, region 1002 wherein the thickness of a thickened portion is under 3 mm, region 1003 having 3 mm ~5 mm of thickness and region 1004 having more than 5 mm of thickness are displayed being attached to region 1001.

The present embodiment is characterized in that distribution information creating means calculates the maximum thickness value of the thickened portion and the position thereof, and distribution information presenting means outputs the data of the calculated value and the position thereof to image display means.

The present embodiment has an advantage that the most affected area of an illness including asbestos can be recognized.

While the preferable embodiments of a medical image display device related to the present invention are described above, the description of specific embodiments is not intended to limit the invention to the particular forms described. It is therefore evident to those skilled in the art that the particular embodiments disclosed above may be altered or modified and all such variations are considered within the scope and spirit of the invention.

The invention claimed is:

1. An image diagnostic support device which is configured to receive data from an image acquisition device that is configured to acquire a tomographic image including a lung region of an object to be examined, the image diagnostic support device comprising:

an image display unit configured to display as an image the tomographic image acquired by the image acquisition device;

a storage unit configured to store one or more programs of executable instructions;

a processing unit configured through execution of the programs to include:

a measurement range setting part that sets a measurement range for extracting a chest wall on the image;

a chest wall extracting part that extracts the chest wall on the image within the set measurement range;

a thickened portion extracting part that extracts a thickened portion attached to the chest wall within the measurement range; and a thickened portion measuring part that measures a thickness of the thickened portion in each position within the measurement range and that obtains a sum of angles viewed from a center of a lung region of thickened portions thicker than predetermined thickness.

2. The image diagnostic support device according to claim 1, wherein the chest wall extracting part extracts the chest wall on the image by connecting positions on an inner side of ribs using spline interpolation.

3. The image diagnostic support device according to claim 1, wherein the thickened portion measuring part measures the thickness of the thickened portion from the chest wall toward an inner side of lungs in respective measurement range positions.

4. The image diagnostic support device according to claim 3, wherein the thickened portion measuring part measures the thickness in a vertical direction with respect to the chest wall.

5. The image diagnostic support device according to claim 1, wherein:
the image displayed by the image display unit is an axial image of the object; and
the measurement range setting part inputs a point on each of right and left lungs at the central positions thereof so as to set a measurement range on the respective lungs.

6. The image diagnostic support device according to claim 5, wherein the image display unit displays the measurement range being set using the measurement range setting part by using an angle viewed from a central position of the respective right and left lungs.

7. The image diagnostic support device according to claim 5, wherein the image display unit displays the measurement range set by the measurement range setting part, and the processing unit determines a length along the chest wall of the right and the left lungs.

8. The image diagnostic support device according to claim 5, wherein the measurement range setting part sets the measurement range of the chest wall by obtaining an end point on each of the right and left lungs, and further obtaining two points, on the chest wall of the right and left lungs, respectively, that are farthest with respect to each of the end points on an upper side and a lower side of the lungs.

9. The image diagnostic support device according to claim 1, wherein the processing unit configured through execution of the programs further includes a fatty area extracting part configured to extract a fatty area on an inner side of the chest wall, and wherein the thickened portion extracting part extracts the thickened portion excluding a fatty area.

10. The image diagnostic support device according to claim 9, wherein:
the image acquisition device is an X-ray CT apparatus; and
the fatty area extracting part determines a region having lower CT value than surrounding area as a fatty area.

11. The image diagnostic support device according to claim 1, wherein the processing unit configured through execution of the programs further includes:
a distribution information creating unit that creates a ratio of an angle viewed from a center of a lung region of the measurement range to the sum of the angles viewed from the center of the lung region of the thicker thickened portions as distribution information; and
a distribution information presenting unit that presents the created distribution information.

12. The image diagnostic support device according to claim 1, wherein the processing unit determines a length along a chest wall of the measurement range and determines a sum of lengths along the chest wall of the thicker thickened portions, and wherein the processing unit configured through execution of the programs further includes:
a distribution information creating unit that creates distribution information based on a ratio of the length along a chest wall of the measurement range to the sum of the lengths along the chest wall of the thicker thickened portions; and
a distribution information presenting unit that presents the created distribution information.

13. The image diagnostic support device according to claim 11, wherein:
the distribution information presenting unit presents a message in the case that the ratio is greater than a predetermined ratio.

14. The image diagnostic support device according to claim 12, wherein:
the distribution information presenting unit presents a message in the case that the ratio is greater than a predetermined ratio.

15. The image diagnostic support device according to claim 11, wherein:
the distribution information creating unit calculates a maximum value of the thickness and a position of the thickened portion; and
the distribution information presenting unit outputs the calculated value and the position to image display unit.

16. The image diagnostic support device according to claim 12, wherein:
the distribution information creating unit calculates a maximum value of the thickness and a position of the thickened portion; and
the distribution information presenting unit outputs the calculated value and the position to image display unit.

* * * * *